United States Patent
Klemba et al.

[11] Patent Number: 6,035,399
[45] Date of Patent: Mar. 7, 2000

[54] CHECKPOINT OBJECT

[75] Inventors: Keith S. Klemba, Santa Clara; Christopher J. Crall, Los Altos; Thomas A. Palmer, San Carlos, all of Calif.; Joseph N. Pato, Arlington, Mass.; Anne H. Anderson, Acton, Mass.; Gregory P. Carpenter, Medford, Mass.

[73] Assignee: Hewlett-Packard Company, Palo Alto, Calif.

[21] Appl. No.: 08/422,206

[22] Filed: Apr. 7, 1995

[51] Int. Cl.[7] ........................................... G06F 12/14
[52] U.S. Cl. ................................................. 713/200
[58] Field of Search .......................... 395/186, 187.01, 395/188.01, 200.59, 683; 707/103, 200, 9

[56] References Cited

U.S. PATENT DOCUMENTS

| | | | |
|---|---|---|---|
| 4,455,093 | 6/1984 | Bowen et al. | 368/10 |
| 4,503,499 | 3/1985 | Mason et al. | 364/200.36 |
| 5,032,979 | 7/1991 | Hecht et al. | 364/200 |
| 5,133,075 | 7/1992 | Risch | 712/1 |
| 5,305,456 | 4/1994 | Boitana | 395/186 |
| 5,483,649 | 1/1996 | Kuznetsov et al. | 395/186 |
| 5,539,906 | 7/1996 | Abraham et al. | 707/9 |
| 5,542,078 | 7/1996 | Martel et al. | 395/600 |
| 5,680,461 | 10/1997 | McManis | 395/683 |
| 5,764,890 | 6/1998 | Glasser et al. | 395/188.01 |
| 5,802,542 | 9/1998 | Coiera et al. | 707/200 |

FOREIGN PATENT DOCUMENTS

| | | | |
|---|---|---|---|
| 0457684A2 | 11/1991 | European Pat. Off. | G06F 15/21 |
| 0495310A2 | 7/1992 | European Pat. Off. | G06F 9/44 |
| 0592072A2 | 4/1994 | European Pat. Off. | G06F 15/21 |

*Primary Examiner*—Robert W. Beausoliel, Jr.
*Assistant Examiner*—Pierre E. Elisca

[57] ABSTRACT

An object oriented tool monitors the step-by-step progress of security administration within an electronic work flow to implement access control measures, and security administration policies that may include additional checks and balances, such as second party review, escalated authorization requirements, and trusted audit facilities. A security administration architecture for distributed electronic data processing systems preferably includes a checkpoint object that provides uniform characterization of milestone or transition states in administration activity, and which may be inherited by or refined to an administration activity object. A checkpoint object manager that is instantiated as a trusted third party object manages the state progression of checkpoint objects. As a result of checkpointing, checkpoint objects are resumed with their state advanced, reversed, or unchanged by the checkpoint object manager as appropriate. The checkpoint object manager also assures that all checkpoints are logged and monitored, and that resumptions are authenticated.

24 Claims, 4 Drawing Sheets

CHECKPOINT OBJECT

BACKGROUND OF THE INVENTION

1. Technical Field

The present invention relates to security administration for electronic data processing systems. More particularly, the present invention relates to a methodology that employs an object-oriented paradigm to govern a step-by-step security administration process for an electronic data processing system.

2. Description of the Prior Art

The banking industry often requires that the approval of more than one authorized person be provided when certain tasks are performed. This is referred to as a two-party system. For example, if a bank customer wants to cash a check for $10,000, the teller to whom the check is presented may need to have a second bank employee, e.g. a supervisor, approve the check. Just as the banking industry requires a two-party system for certain levels of security administration, such security administration is also required by various other industries, e.g. telephone companies, for example when establishing new telephone numbers.

This two-party approach is also necessary for transactions that involve electronic information, especially as such electronic transactions become increasingly commonplace. For example, it is desirable to be able to perform an electronic task to a certain point and then freeze that task until the task related transaction can be verified and/or authorized by an appropriate person. That is, someone in authority must approve the transaction at its present stage before it may be moved on to the next step.

Related to such two-party systems is the concept of work flow. For example, certain software products provide a work flow in which a first person performs a particular task for a period of time and then another person continues the task for a period of time. Thereafter, the task may be performed by yet other persons until, at some point, it returns to the first person. Such work flow has a security administration element when a person performing a task must break at a defined point, at which time a next level manager, i.e. someone with appropriate authority and accountability, completes the task at that level, e.g. by approving a transaction, before the task can be moved to the next step.

The architecture of such security administration is just as important as that of security measures themselves. For example, if locks are put on all the doors, but the keys are given out indiscriminately it doesn't matter how good the locks are. In an electronic data processing system, it may be possible to provide the appearance of proper two-party authorization through employee collusion or fraud. Consequently, it is necessary to have a comprehensive tool for governing the administration of security policies in the context of electronic work flow.

SUMMARY OF THE INVENTION

The invention provides an object oriented tool that monitors the step-by-step progress of security administration within an electronic work flow. In addition to access control measures, security administration policies implemented by the invention may include additional checks and balances, such as second party review, escalated authorization requirements, and trusted audit facilities. Thus, the invention provides a security administration architecture for distributed electronic data processing systems.

The architecture preferably includes:

A checkpoint object that provides uniform characterization of milestone or transition states in administration activity. This object class definition is designed to be inherited by or refined to an administration activity object. For example, an Install_User object might inherit a Checkpoint_Object class, such that the Install_User activity must checkpoint at a final stage of installation to obtain second party approval before installation may be completed; and A checkpoint object manager which is instantiated as a trusted third party object that manages the state progression of checkpoint objects. For example, objects that possess Checkpoint_Object calls are able to checkpoint their activities to the Checkpoint_Object_Manager_Object. As a result of checkpointing, the checkpointed objects are resumed with their state advanced, reversed, or unchanged by the checkpoint object manager as appropriate. The checkpoint object manager also assures that all checkpoints are logged and monitored, and that resumptions are authenticated.

Because the checkpoint object and checkpoint object manager are object oriented, it is possible to inherit into each object an object class, ie. the check point object, having any desired security administration attributes. Any object that has these attributes, or that has inherited this class, can then be managed by the checkpoint object manager. In this way, a task may be performed until it reaches a checkpoint, at which time the process can check-in an object to the checkpoint object manager. Once checked-in, the object cannot be checkedout unless certain criteria that implement security administration policies are met. The checkpoint object also allows a person to suspend work on a task, for example to take a break, and the work may not resumed, except as authorized. Furthermore, failure to resume a suspended task, either by receiving authorization from an authorized person or by returning to the task within a predetermined time, may provide a system alert in which the checkpoint object manager escalates the checkpoint object.

DETAILED DESCRIPTION OF THE INVENTION

The invention provides an object oriented tool consisting of a checkpoint object and a checkpoint object manager that comprise a system which continually monitors the step-by-step progress of security administration within an electronic work flow. In addition to access control measures, the invention implements security administration policies that may include additional checks and balances, such as second party review, escalated authorization requirements, and trusted audit facilities. Because the checkpoint object and checkpoint object manager are object oriented, it is possible to inherit into each object an object class, i.e. the checkpoint object, having any desired security administration attributes. Any object that has these attributes, or that has inherited this class, is managed by the checkpoint object manager.

In the system herein disclosed, execution of a task can proceed to a certain point, at which point the process can check-in a checkpoint object with the checkpoint object manager. The checkpoint object cannot be checked-out from the checkpoint object manager unless certain criteria that implement security administration policies are met. The use of a checkpoint object also allows one to suspend work on a task, for example to take a break, and the work may not resumed, except as authorized. Furthermore, failure to resume a suspended task, either by receiving authorization from an authorized person and/or by returning to the task within a predetermined time, may provide a system alert in which the checkpoint object manager escalates the checkpoint object.

Figure 1:
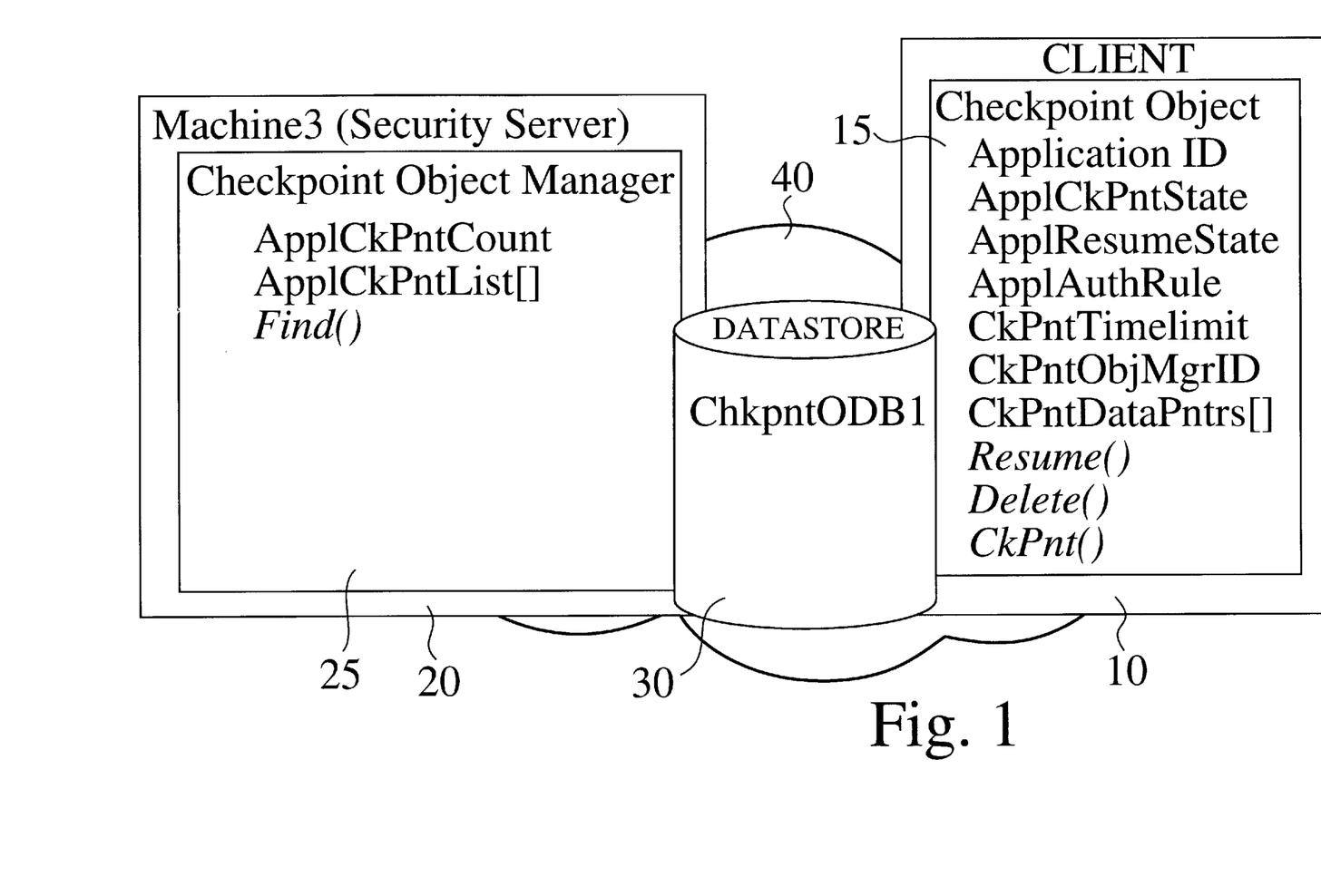
FIG. 1 is a block diagram of a security administration architecture for a distributed electronic data processing system according to the invention.

FIG. 1 is a block diagram of a security administration architecture for a distributed electronic data processing system. The architecture consists of one or more clients 10, a security server 20, and a datastore 30, all of which are distributed across an electronic network 40.

Each client 10 may include:

A checkpoint object 15 that provides uniform characterization of milestone or transition states in security administration activity, and that may be inherited by or refined to an administration activity object. For example, an Install_User object might inherit a Checkpoint_Object class, i.e. it can become a checkpoint object, such that the Install_User activity must checkpoint at a final stage of installation to obtain second party approval before installation may be completed.

The security server 20 may include:

A checkpoint object manager 25 which is instantiated as a trusted third party object that manages the state progression of the checkpoint objects 15. For example, objects that possess Checkpoint_Object calls, i.e. checkpoint objects, are able to checkpoint their activities to the Checkpoint_Object_Manager_Object, i.e. the checkpoint object manager. As a result of checkpointing, the checkpointed objects are resumed with their state advanced, reversed, or unchanged by the checkpoint object manager, as appropriate, and consistent with local security administration policies. The checkpoint object manager assures that all checkpoints are logged and monitored, and that resumptions are authenticated.

The preferred embodiment of the invention is implemented using object-oriented programming techniques. Such techniques are well known to those skilled in the art. See, for example *Object-Oriented Systems Analysis*, Shlaer and Mellor, Yourdon Press (1988); and *The Electrical Engineering Handbook*, Dorf, CRC Press (1993).

In object-oriented systems, abstractions are produced that correspond to sets of things. These things are referred to as objects. Each object has a set of attributes which describe the object's characteristics. A specific occurrence of an object, in which the object's attributes are populated with data, is referred to as an instance. All instances within a set of instances have the same characteristics and are subject to and conform to the same rules of behavior.

Referential attributes are used to maintain the relationships between different objects.

An object-oriented paradigm is a programming paradigm in which a system is modeled as a collection of self-contained objects that interact by sending messages. Objects are modules that contain both encapsulated data and all of the functions that are allowed to be performed on the encapsulated data. Objects are related to one another through an inheritance hierarchy.

In languages that support object-oriented programming, classes (i.e. data types) of objects are defined by specifying the variable that each object owns as instance variables, and operations, referred to as methods, which are applicable to objects of the class. These methods are sent to an object as a message. New objets of a class are created, usually dynamically, by factory methods addressed to the class itself. These methods allocate the equivalent of a record having fields that are the instance variables of the object, and return a reference to this record, which represents a new object. After its creation, an object can receive messages from other objects.

In addition to data abstraction, object-oriented programming provides inheritance in which new subclasses are derived from an existing class by adding instance variables and/or methods. Each subclass inherits the instance variables and methods of its superclass. Objects, which are instances of classes, may represent visible objects. Actions applied to one objet may influence another object. In the context of the invention herein, the creation of a checkpoint object in accordance with a security administration policy, may cause the checkpoint object manager (which is itself an object) to take some action (such as notifying a supervisor that authentication or approval is required) that, in turn, allows the modification of checkpoint object (by resuming a suspended task).

Figure 2:
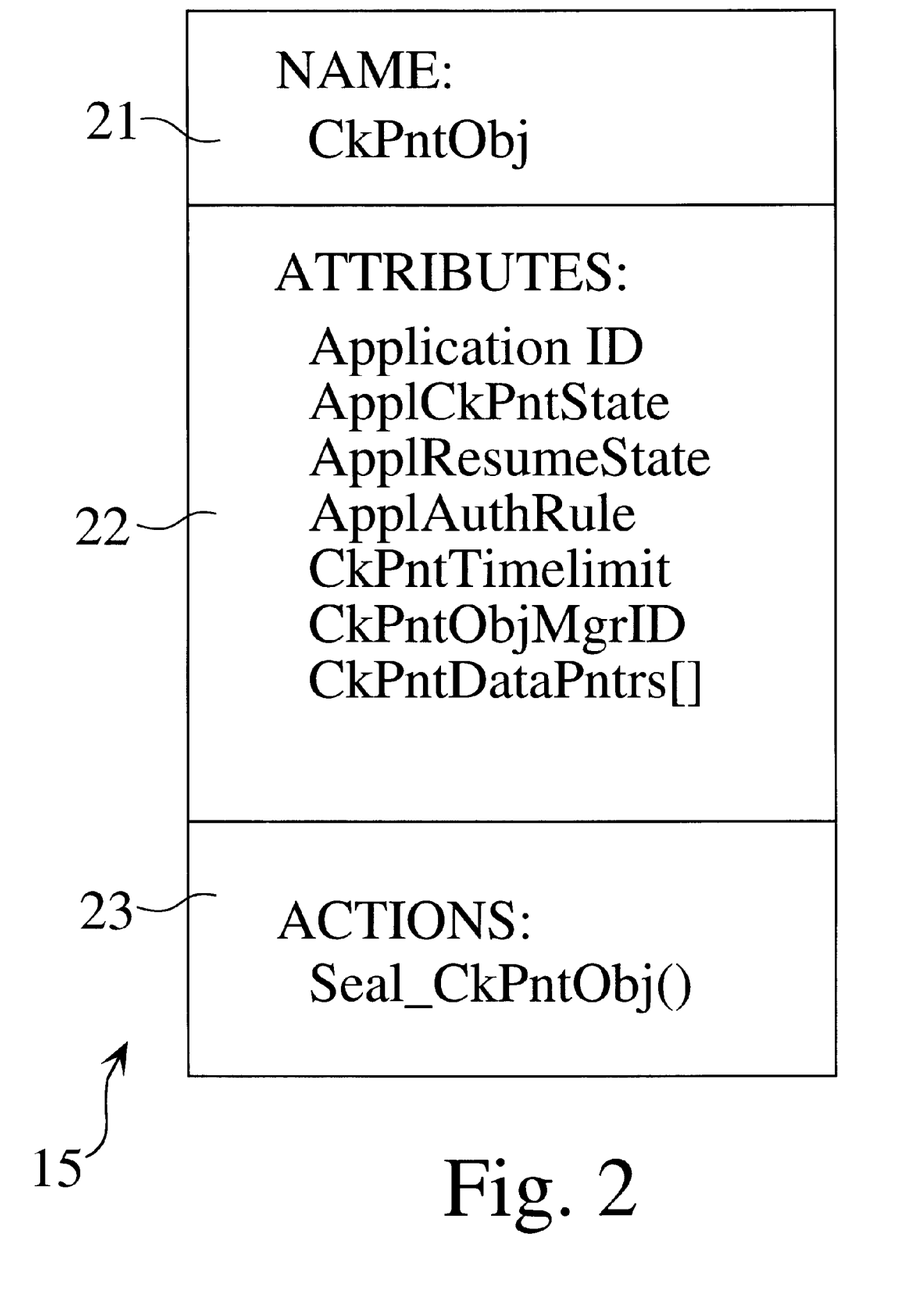
FIG. 2 is a block diagram of a checkpoint object according to the invention.

FIG. 2 is a block diagram of a checkpoint object 15 according to the invention.

The checkpoint object has a name CkPntObj 21, attributes 22, and related actions 23.

The checkpoint object preferably has one or more of the following attributes:

ApplicationID—This attribute identifies the name of the application that sets the context for the checkpoint. Because the states of an application are likely to be similar for several applications, state information alone is not sufficient to identify the activity in the checkpoint object. Accordingly, an application identifier is also provided.

ApplCkPntState—This attribute indicates the state of a checkpoint object at the time of the checkpoint. See the "ApplResumeState" attribute for related state information.

ApplResumeState—This attribute indicates the state with which a checkpoint object should resume. This attribute is used by the checkpoint object manager (discussed below) to index into the authorization rule that applies to the present application.

ApplAuthRule—This attribute is a signed authorization rule that is used by the present application. These rules are generally indexed by states such that they govern the authorization entitlements as an application's activities progress.

CkPntTimeLimit—This attribute indicates the time limit that the checkpoint object may reside with the checkpoint manager. If this time limit is exceeded, the checkpoint manager issues an event to signal escalation of checkpoint attention.

CkPntObjMgrID—This attribute records a list of all checkpoint object managers that have serviced this checkpoint object so far.

CkPntDataPntrs[ ]—This attribute is a list of pointers to current checkpoint data. The checkpoint object manager does not understand the semantics of this data. This data structure is stored as binary data by the checkpoint object manager. If the data comprise a pointer, then only a pointer is returned by the checkpoint object manager. If the data comprise the actual data, then the data are stored by the checkpoint object manager CkPntSeal—This attribute is a trusted seal of the current checkpoint object information.

The checkpoint object preferably has at least the following action:

Seal_CkPntObj( )—This action computes the CkPntSeal attribute. Note that the seal covers all data of relevance in the context of the application.

Figure 3:
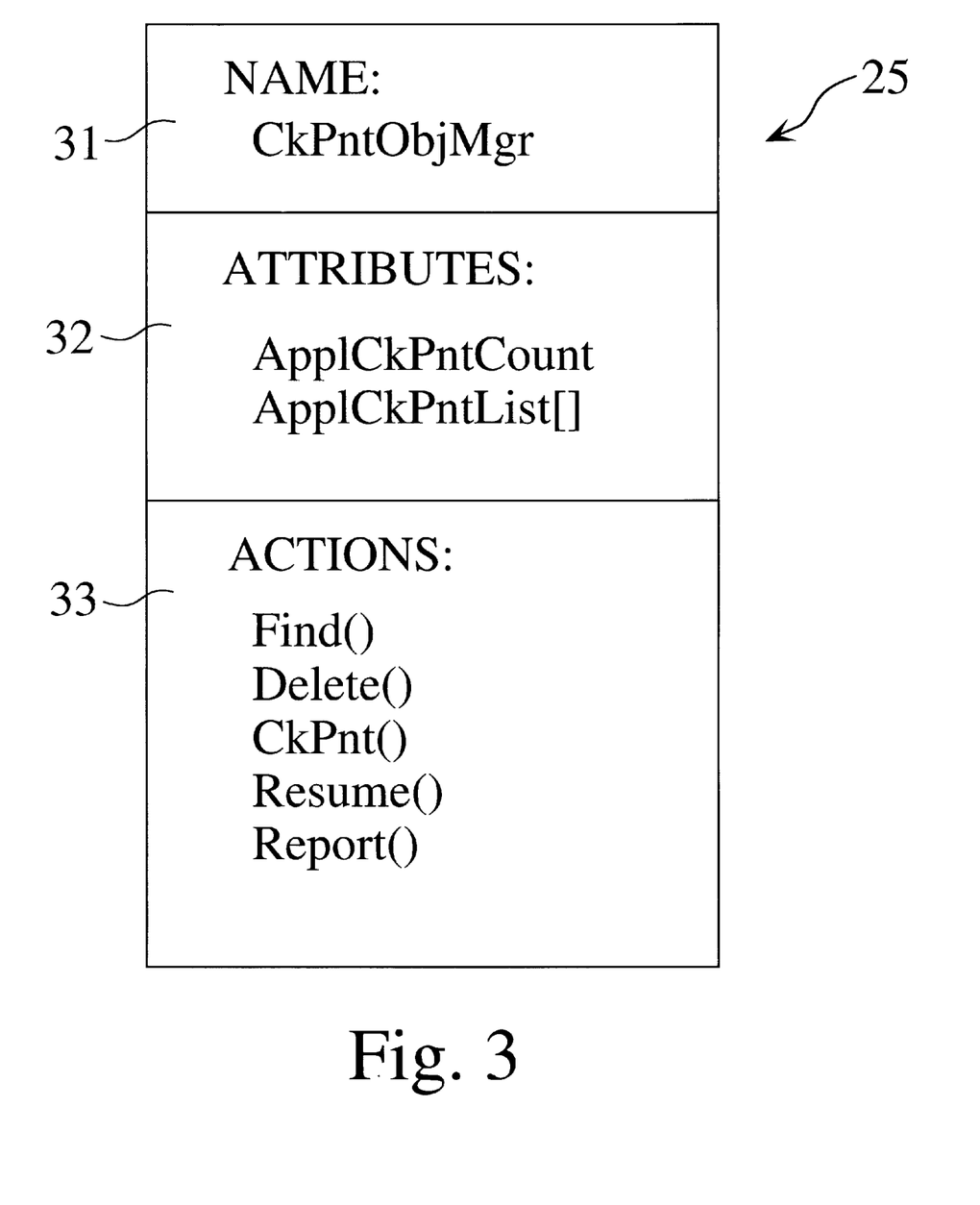
FIG. 3 is a is a block diagram of a checkpoint object manager object according to the invention.

FIG. 3 is a is a block diagram of a checkpoint object manager 25 according to the invention. The checkpoint object manager has a name CkPntObjMgr 31, attributes 32, and related actions 33.

The checkpoint object manager preferably has one or more of the following attributes:

ApplCkPntCount—This attribute is a count of the checkpoint objects that are currently checkpointed by the checkpoint object manager.

ApplCkPntList[ ]—This attribute is a non-ordered list of the checkpoint objects that are currently checkpointed by the checkpoint object manager.

The checkpoint object manager preferably may take one or more of the following actions:

Find( )—This action searches the ApplCkPntList for objects that match the criteria of passed arguments.

Delete( )—This action attempts to delete a checkpointed object. The authorization required for this action is not associated with the application context, but rather with administration entitlements for the checkpoint object manager.

CkPnt( )—This action checkpoints an application object that contains the CkPntObj class behavior. Checkpointing a checkpoint object captures all CkPntObj attributes and checks the suspended checkpoint object in its present state into the CkPntObjMgr datastore. The checkpoint object manager CkPntObjMgr holds this data, and waits for the next application service to check out the checkpoint object, such that the application may resume processing.

Resume( )—This action passes all of the checkpoint object attributes for the identified checkpointed object to a calling object after first passing the authorization rules to the calling object.

Report( )—This action produces one of several reports, including reports that are customized by passed arguments. Reports draw from checkpoint object manager log/audit files, as well as currently checkpointed data.

Figure 4:
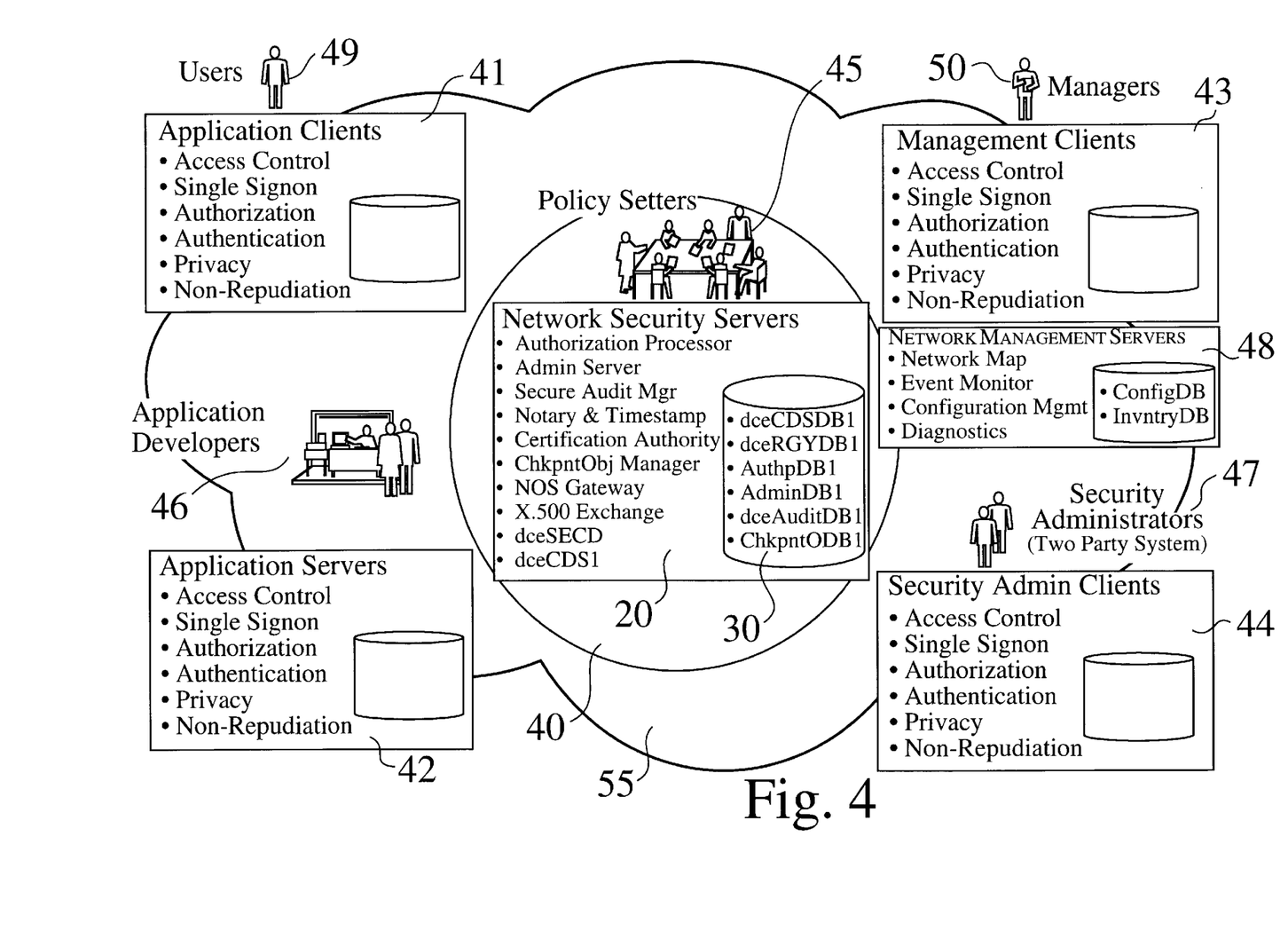
FIG. 4 is an architectural overview of a security administration system according to the invention.

FIG. 4 is an architectural overview of a security administration system according to the invention. Within the context of an system 55, there are several other functions, including for example application developers 46, policy setters 45, managers 50, and security administrators 47 (for example, in a two-party system, as discussed above). Each function has an associated electronic presence in a network 40. For example, this particular embodiment of the invention resides in an electronic data processing environment in which various users 49 interact with application clients 41 to perform various system tasks. Security administration policy is implemented in this embodiment of the invention by the application client to supervise user access, sign-on procedures, authorization and authentication, user privacy, and non-repudiation. Any of these activities may generate a checkpoint object that suspends the application client until the client state is advanced by a return from the checkpoint object manager that allows the client to proceed.

Similarly, the application developers 46 are present via application servers 42 that implement security administration policy is implemented to supervise user access, sign-on procedures, authorization and authentication, user privacy, and non-repudiation. As with application clients, any of these activities may generate a checkpoint object that suspends the application server until the server state is advanced by a return from the checkpoint object manager that allows the server to proceed.

These same functions may also be implemented for managers 50 as management clients 43, and for security administrators 47 as security administration clients 44.

Within the realm of the policy setters 45 reside the network security servers 20 that include such functions as processing authorizations, providing an administration server, providing a secure audit manager, performing notary and time stamp functions, providing certification authority, implementing the checkpoint object manager, and various other functions, including providing a location for the datastore 30.

Finally, the network 40 includes network management servers 48 that implement such network-related functions as providing a network map, providing an event monitor, allowing network management to configure the network, and providing network diagnostics.

As discussed above, the invention provides a checkpoint object that suspends progress on a task until some action is taken by the checkpoint object manager with regard to the task. For example, a credit transaction cannot proceed until the transaction is approved by a supervisor. The checkpoint object also allows one to suspend work intentionally. For example, one may working on a very important activity and it's lunch time. One would check the checkpoint object into the checkpoint object manager, i.e. the object is checkpointed, and then one could go to lunch. If the checkpoint object manager is not timely notified after a reasonable interval, the system recognizes that no one has checked the checkpoint object back out of the checkpoint object manager, and it escalates by sending out an alert to the effect that, "This was activity begun, and I'm waiting for someone to either pull it back out at the same level or for a manager to take it."

The checkpoint object manager can monitor that no one is checking the checkpoint object out, even though the checkpoint object manager does not know the specific semantics of the transaction in question, e.g. whether an account is being opened, a real estate deal is being cleared, or an employee is just going to lunch. The checkpoint object manager only knows that a checkpoint object has been checked in, that the checkpoint object has certain attributes and qualifiers, and that it is necessary to escalate the checkpoint object if someone having appropriate credentials does not check the checkpoint object out again. Furthermore, to check the checkpoint object out of the checkpoint object manager, it may be necessary to execute additional authentication schemes to prove that the person checking out the checkpoint object is the manager at the next level, or alternatively the person who checked the checkpoint object in in the first place to suspend the transaction.

One important aspect of the invention is that the security of the checkpoint object manager guarantees that the checkpoint object is not modified while it is checked in to the checkpoint object manager because the checkpoint object cannot be read while it is checked in. In fact, no one can read the checkpoint object at this point other than the next escalated person, or the person who checked in the checkpoint object, if it was checked in to suspend the transaction temporarily. Therefore, no unauthorized individual can browse the checkpoint object. Thus, the invention provides a system that ensures the privacy and integrity of the system's task work flow, as well as information contained within the task. The invention also provides a system that ensures that a task receives proper attention, and that can escalate a task within an system's administration if the checkpoint object is not checked out by the proper person and/or within a predetermined period of time.

Another important aspect of the invention is that it provides a system that deposits information. For example, the invention provides a system that includes a secure audit feature, e.g. if a customer is opening a new checking account and the task of opening the account requires a first person to create the account, then a supervisor must verify the account before the customer has the account, i.e. a two-party system. One piece of information that leaves a trace behind is the time at which the account was checkpointed for approval and was approved. The checkpoint object manager makes an entry that indicates that the checkpoint object was checked in for checkpointing. The entry includes such information as the person from whom the checkpoint object was checked in and the time at which the checkpoint object was checked in. These entries are among the attributes of the checkpoint object which are discussed above. Accordingly, the checkpoint object manager faithfully records all relevant information connected with the transaction such that later an auditor can reference back to the checkpoint object manager, which is a secure system, to obtain a secure audit trail of work flow within the system.

The checkpoint object manager herein described is especially useful when employed in parallel with an actual work flow program because work flow software only moves work along, it does not provide a secure audit trail of the work itself, e.g. who handled each portion of the task, as what time, and with what disposition. The audit trail provided by the invention includes a digital signature that provides robust and detailed authentication characters, such that each person in the work flow is readily identified with the task they performed.

Thus, the person doing a task takes it to a certain point and then checks it into the checkpoint object manager. The checkpoint object manager is provided with a list of supervisors within the system who can authorize transactions. Such supervisory management of system security can be one-to-one, i.e. a single manager for the checkpointed employee; or it may be a set of managers who are contacted by the checkpoint object manager, any one of which can check-in to the checkpoint object manager, review and approve the transaction in question, and then release the transaction back to the checkpointed employee, via the checkpoint object manager.

In practice, when an employee reaches the point in the work flow, for example filling out screens by putting in names and addressees, where the present part of the task is finished, then the employee indicates this portion of the task is complete and ready for checkpointing, e.g. the employee pushes a button requesting approval. At this point, the employee's display may go blank and the employee goes on and does something else while waiting for the approval. What happens when approval is requested is that the request is encapsulated into a checkpoint object and registered into the checkpoint object manager. As discussed above, the checkpoint object manager only accepts authorization from appropriate supervisors. Such supervisors may have a password or a digital signature that they enter into the system to indicate to the system that they are who they say they are.

Typically, a password is something very personal and private to the supervisor that is not easily duplicated, e.g. a smart card. For example, the smart card may be a manager-of-the-day smart card, where the supervisor logs in on the system as the manager of the day. The next day someone else is manager of the day, and even though the previous manager of the day can still log in on the system, only without the privileges of the manager of the day. The system always, through each supervisor, keeps an audit trail of all authorizations, such that if there is an irregularity in the system, there is a record of which manager and which clerk, for example, were involved. It is then possible to perform an audit of the system and determine why the wrong authorization was given. Additionally, the system records when the authorization fails. In this way it is possible to identify when employees are in collusion to defraud the system.

Although the invention is described herein with reference to the preferred embodiment, one skilled in the art will readily appreciate that other applications may be substituted for those set forth herein without departing from the spirit and scope of the present invention. Accordingly, the invention should only be limited by the claims included below.

We claim:

1. An apparatus for monitoring step-by-step progress of security administration within an electronic work flow, comprising:

a checkpoint object that provides uniform characterization of milestone and/or transition states in administration activity, where object class definition is inherited by or refined to an administration activity object; and a checkpoint object manager that is instantiated as a trusted third party object which manages state progression of checkpoint objects;

wherein said checkpoint object manager further comprises at least one of:

an action that resumes checkpointed objects with their state either advanced, reversed, or unchanged; and an action that assures that all checkpoints are logged and/or monitored.

2. The apparatus of claim 1, wherein the checkpoint object manager further comprises:

an action that assures that all resumptions are authenticated.

3. The apparatus of claim 1, wherein said checkpoint object must checkpoint to said checkpoint object manager to obtain second party approval.

4. The apparatus of claim 1, wherein said checkpoint object manager provides any of second party review, escalated authorization requirements, and trusted audit facilities.

5. The apparatus of claim 1, wherein said checkpoint object may inherit an object class having any desired security administration attributes; and wherein any object that has these attributes, or that has inherited this class, can then be managed by said checkpoint object manager.

6. The apparatus of claim 1, further comprising:

a task that may be performed as part of a process until it reaches a checkpoint, at which point the process check-ins a checkpoint object to said checkpoint object manager, wherein said checkpoint object cannot be checked-out of said checkpoint object manager unless criteria that implement security administration policies are met.

7. The apparatus of claim 1, wherein said checkpoint object allows suspension of a task, and said task may not resumed, except as authorized.

8. The apparatus of claim 7, wherein said checkpoint object manager escalates said checkpoint object upon failure to resume a suspended task, either by receiving authorization and/or by returning to said task within a predetermined time.

9. The apparatus of claim 1, said checkpoint object further comprising one or more of the following attributes:
an applicationID attribute which identifies a name of an application that sets the context for this checkpoint;
an ApplCkPntState attribute that indicates a state of an object when a checkpoint is performed;
an ApplResumeState attribute that indicates a state with which an object should resume;
an ApplAuthRule attribute which is a signed authorization rule that is used by a current application, where said rule is indexed by states such that it governs authorization entitlements as said application's activities progress;
a CkPntTimeLimit attribute that indicates a time limit that said checkpoint object may reside with said checkpoint manager, where if said time limit is exceeded, said checkpoint manager issues an event to signal escalation of checkpoint attention;
a CkPntObjMgrID attribute that records a list of all checkpoint object managers that have currently serviced a checkpoint object;
a CkPntDataPntrs[ ] attribute that provides a list of pointers to current checkpoint data, where said data is stored as binary data by said checkpoint object manager, such that if the data comprise a pointer, then only a pointer is returned by said checkpoint object manager; and such that if the data comprise actual data, then the data are stored by said checkpoint object manager; and
a CkPntSeal attribute that provides a trusted seal of current checkpoint object information.

10. The apparatus of claim 1, said checkpoint object further comprising at least the following action:
a Seal_CkPntObj( ) action that computes a CkPntSeal attribute, where said CkPntSeal attribute provides a trusted seal of current checkpoint object information.

11. The apparatus of claim 1, said checkpoint object manager further comprising one or more of the following attributes:
an ApplCkPntCount attribute that provides a count of checkpoint objects that are currently checkpointed by the checkpoint object manager; and
an ApplCkPntList[ ] attribute that provides a non-ordered list of checkpoint objects that are currently checkpointed by the checkpoint object manager.

12. The apparatus of claim 1, said checkpoint object manager further comprising one or more of the following actions:
a Find( ) action that searches an ApplCkPntList attribute for objects that match a criteria of passed arguments, where said ApplCkPntList attribute provides a non-ordered list of checkpoint objects that are currently checkpointed by the checkpoint object manager;
a Delete( ) action that is adapted to delete a checkpointed object, where authorization required for the Delete( ) action is associated with administration entitlements for said checkpoint object manager;
a CkPnt( ) action that checkpoints an application object that contains the CkPntObj class behavior, where checkpointing an object captures all CkPntObj attributes and checks a suspended object in its present state into a CkPntObjMgr datastore, where said CkPntObjMgr holds this information, and waits for a next application service to check out said object and resume processing;
a Resume( ) action that passes all checkpoint attributes for an identified checkpointed object to a calling object after first passing authorization rules to said calling object; and
a Report( ) action that produces at least one report drawn from checkpoint object manager log/audit files and/or currently checkpointed data.

13. A method for monitoring step-by-step progress of security administration within an electronic work flow, comprising the steps of:
providing a checkpoint object that provides uniform characterization of milestone and/or transition states in administration activity, where object class definition is inherited by or refined to an administration activity object;
providing a checkpoint object manager that is instantiated as a trusted third party object which manages state progression of checkpoint objects;
checkpointing a checkpoint object; and further comprising at least one of the steps of:
providing an action via said checkpoint object manager that resumes checkpointed objects with their state either advanced, reversed, or unchanged; and
providing an action via said checkpoint object manager that assures that all checkpoints are logged and/or monitored.

14. The method of claim 13, further comprising the steps of:
interrupting a task;
checkpointing a checkpoint object; and
providing an action via said checkpoint object manager that assures that all resumptions of said interrupted task are authenticated.

15. The method of claim 13, further comprising the step of:
checkpointing said checkpoint object to said checkpoint object manager to obtain second party approval.

16. The method of claim 13, further comprising the step of:
providing via said checkpoint object manager any of second party review, escalated authorization requirements, and trusted audit facilities.

17. The method of claim 13, wherein said checkpoint object may inherit an object class having any desired security administration attributes; and wherein any object that has these attributes, or that has inherited this class, can then be managed by said checkpoint object manager.

18. The method of claim 13, further comprising the steps of:
performing a task as part of a process until it reaches a checkpoint; and
checking-in a checkpoint object to said checkpoint object manager, wherein said checkpoint object cannot be checked-out of said checkpoint object manager unless criteria that implement security administration policies are met.

19. The method of claim 13, further comprising the step of:
suspending a task with said checkpoint object manager, wherein said task may not resumed, except as authorized.

20. The method of claim 19, further comprising the step of:

escalating said checkpoint object with said checkpoint object manager upon failure to resume a suspended task, either by receiving authorization and/or by returning to said task within a predetermined time.

21. The method of claim 13, said checkpoint object comprising one or more of the following attributes:

an applicationID attribute which identifies a name of an application that sets the context for this checkpoint;

an ApplCkPntState attribute that indicates a state of an object when a checkpoint is performed;

an ApplResumeState attribute that indicates a state with which an object should resume;

an ApplAuthRule attribute which is a signed authorization rule that is used by a current application, where said rule is indexed by states such that it governs authorization entitlements as said application's activities progress;

a CkPntTimeLimit attribute that indicates a time limit that said checkpoint object may reside with said checkpoint manager, where if said time limit is exceeded, said checkpoint manager issues an event to signal escalation of checkpoint attention;

a CkPntObjMgrID attribute that records a list of all checkpoint object managers that have currently serviced a checkpoint object;

a CkPntDataPntrs[ ] attribute that provides a list of pointers to current checkpoint data, where said data is stored as binary data by said checkpoint object manager, such that if the data comprise a pointer, then only a pointer is returned by said checkpoint object manager; and such that if the data comprise actual data, then the data are stored by said checkpoint object manager; and a CkPntSeal attribute that provides a trusted seal of current checkpoint object information.

22. The method of claim 13, said checkpoint object comprising at least the following action:

a Seal_CkPntObj( ) action that computes a CkPntSeal attribute, where said CkPntSeal attribute provides a trusted seal of current checkpoint object information.

23. The method of claim 13, said checkpoint object manager comprising one or more of the following attributes:

an ApplCkPntCount attribute that provides a count of checkpoint objects that are currently checkpointed by the checkpoint object manager; and an ApplCkPntList[ ] attribute that provides a non-ordered list of checkpoint objects that are currently checkpointed by the checkpoint object manager.

24. The method of claim 13, said checkpoint object manager comprising one or more of the following actions:

a Find( ) action that searches an ApplCkPntList attribute for objects that match a criteria of passed arguments, where said ApplCkPntList attribute provides a non-ordered list of checkpoint objects that are currently checkpointed by the checkpoint object manager;

a Delete( ) action that is adapted to delete a checkpointed object, where authorization required for the Delete( ) action is associated with administration entitlements for said checkpoint object manager;

a CkPnt( ) action that checkpoints an application object that contains the CkPntObj class behavior, where checkpointing an object captures all CkPntObj attributes and checks a suspended object in its present state into a CkPntObjMgr datastore, where said CkPntObjMgr holds this information, and waits for a next application service to check out said object and resume processing;

a Resume( ) action that passes all checkpoint attributes for an identified checkpointed object to a calling object after first passing authorization rules to said calling object; and a Report( ) action that produces at least one report drawn from checkpoint object manager log/audit files and/or currently checkpointed data.

* * * * *